Patented Jan. 19, 1932

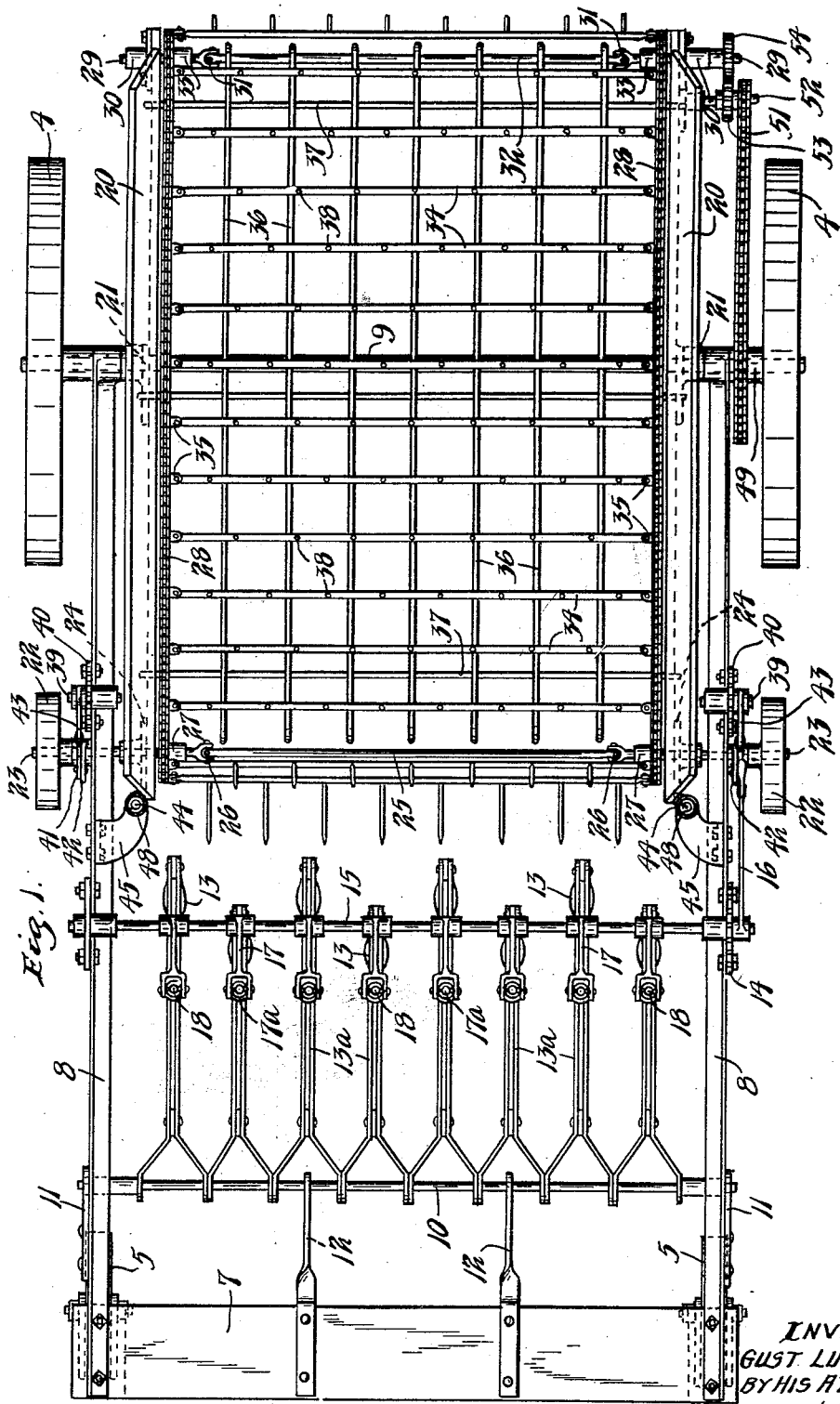

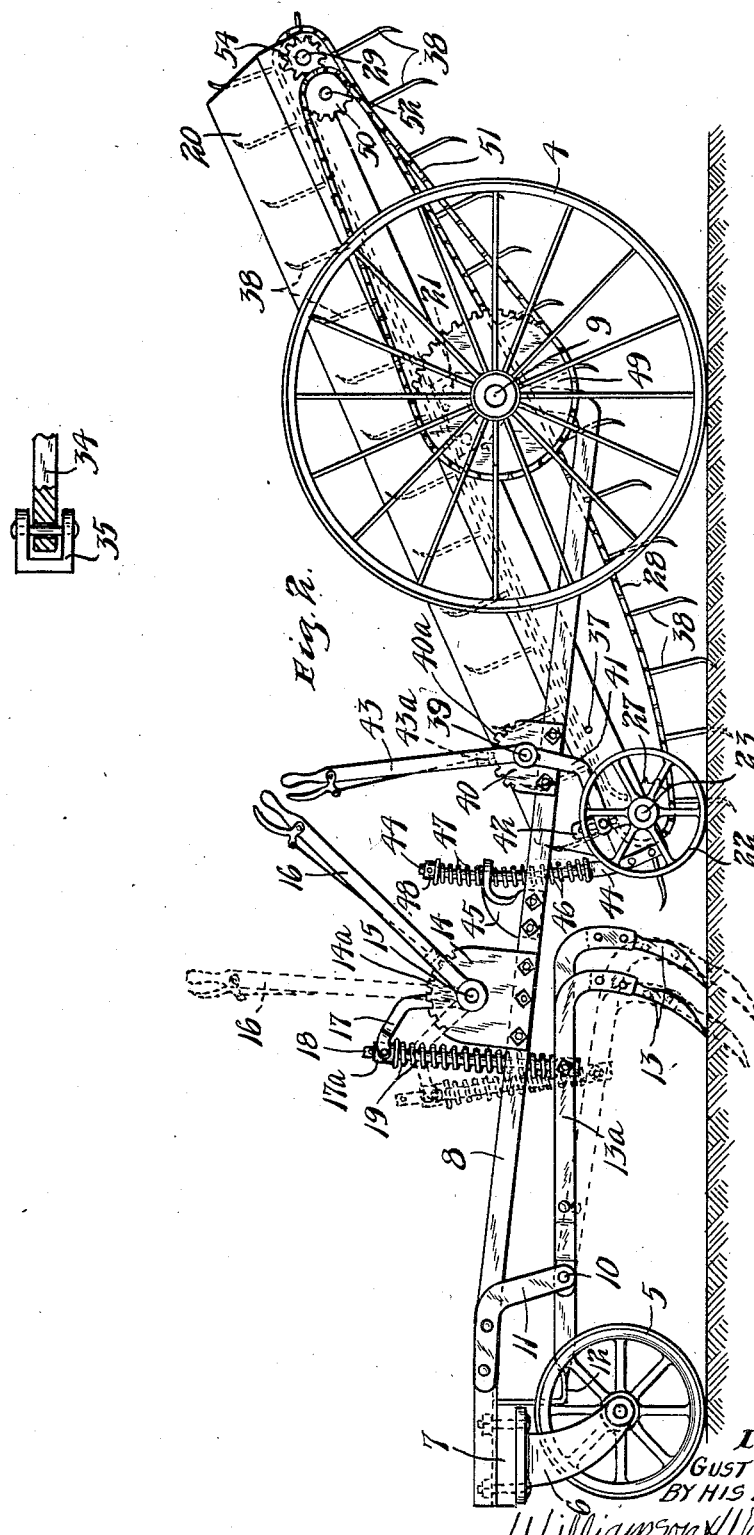

1,841,659

UNITED STATES PATENT OFFICE

GUST LUNDQUIST, OF NORTHWOOD, NORTH DAKOTA

QUACK GRASS MACHINE

Application filed August 16, 1930. Serial No. 475,653.

This invention relates to machines for digging and removing quack grass and other weeds from the soil.

In certain portions of the United States and Canada, such as for example Minnesota, North and South Dakota, quack grass has spread very rapidly practically ruining the soil for the raising of crops. The roots of the quack grass are very thick, are firmly entrenched in the ground and spread rapidly.

Various devices have been designed for removing quack grass but most have been found unsatisfactory in that they have severed the roots, thereby only giving temporary relief and eventually resulting in spreading and increasing the mass of roots beneath the soil.

It is an object of my present invention to provide a comparatively simple, economical and highly efficient machine for digging and removing quack grass and other weeds from the soil, separating the same from the dirt without severing the roots.

More specifically it is an object to provide a machine adapted to be drawn by horse power or tractor wherein means for loosening the upper strata of the soil containing the quack grass and roots are closely co-ordinated with a series of pickers or teeth which penetrate the loosened soil to a considerable depth bodily removing and elevating the roots and quack grass without severing the same.

Another object of my invention is to provide an efficient machine of the class described which is adapted to operate upon a relatively wide swath, provision being made for imparting a flexibility to the frame and mechanism upon which the picker teeth and ground loosening means are mounted whereby the same will be self-adjustable to variations in the level of the ground over which the machine travels.

Another object is to provide in a machine of the class described a wheeled frame upon which adjustable ground loosening shovels are mounted and an endless conveyor, the front of which is interposed directly behind said shovels and which carries outwardly projecting picker teeth penetrating the soil and bodily removing the quack grass and roots, the shafts of said conveyor and slats on which the picker teeth are mounted being flexibly connected in order that the teeth may be disposed properly to penetrate the ground regardless of irregularities of the surface over which the machine travels.

These and other objects and advantages of the invention will be fully set forth in the following description made in connection with the accompanying drawings, in which like reference characters refer to similar parts throughout the several views, and wherein:—

Fig. 1 is a plan view of an embodiment of my invention;

Fig. 2 is a side elevation of the same, dotted lines indicating the operative or depending position of the ground loosening shovels and operating mechanism therefor, and Fig. 3 is a detail view showing the manner in which the several teeth supporting slats of the endless conveyor are mounted.

As shown in the drawings, my quack grass digger comprises a suitable frame supported at its rear end upon a pair of relatively large wheels 4 and at its forward end by a pair of steering wheels 5 which carry a bolster 6 swivelly connected to a front cross bar 7 of the frame. The main frame may comprise a pair of longitudinal members 8 being connected at their forward ends with cross bar 7 and being connected at their rearward ends with the rear axle 9.

A cross rod 10 is supported below the forward end of the frame by means of a pair of end brackets 11 and medial brackets 12. To said cross rod a series of ground loosening shovels 13 are swingably mounted. Said shovels are of the cultivator shovel type, however preferably being relatively narrow and free from sharp cutting edges. Shovels 13 are detachably secured to the depending and turned ends of supporting arms 13a, the forward ends of which may be bifurcated and swingably secured to cross rod 10.

Across the top of longitudinal frame members 8 and journaled in suitable end brackets 14 I provide an operating rock shaft 15 for said ground loosening shovels, said rocker shaft having fixed thereto an operating handle 16 which may have conventional tooth engagement with a notched sector 14a. Rocker shaft 15 has fixed thereto a series of rocker arms 17 which control the position of the shovels. Connection is made between the outer ends of said rocker arms and the shovel supporting arms 13a by means of rods 18 having slidable engagement at their upper ends with sleeves 17a connected with said rocker arms and coiled springs 19 surround rods 18 and are interposed between the sleeves 17a and the arms 13a of the ground loosening shovels, said springs yieldingly urging the cultivator shovels in a downward direction.

An inclined endless conveyor is mounted at the rear of the frame directly behind the ground loosening shovels. This conveyor may include side frame members 20 supported at their medial portions by means of brackets 21 pivotally connected with rear axle 9. The forward end of the conveyor frame comprising sides 20 is adjustably supported from the ground by means of a pair of small wheels 22, each of which is revolubly and loosely mounted on a horizontal stub shaft 23 journaled in a suitable bearing 24 secured to the lower and front portion of one of the side members 20. The two stub shafts 23 project through sides 20 of the conveyor frame and are secured to a connecting shaft 25 by universal couplings or joints 26. The stub shafts at the inner sides of conveyor sides 20 have fixed thereto sprockets 27 about which endless chains 28 of the conveyor are trained. At the rear end of the conveyor frame two axially aligned stub shafts 29 are journaled in bearings 30 which may be secured to the rear ends of the conveyor frame sides 20. Said stub shafts extend through said sides and are connected by universal joints 31 with a connector shaft 32. On stub shafts 29 are fixed sprockets 33 which with the sprockets 27 constitute the conveyor mounting for endless chains 28.

Spaced slats 34 are flexibly secured across the two chains 28 and a suitable flexible connection is illustrated in Fig. 3, certain of the links of said chains carrying or having integrally formed therewith forks 35 between which the ends of said slats are loosely pivoted, said forks being sufficiently wide to afford clearance between the connected ends of the slats and the sides thereof. The slats 34 travel over a series of longitudinally disposed parallel rods 36 which may be supported from end cross rods 37 fixed to the sides 20 of the conveyor frame, rods 36 extending substantially parallel with the upper edges of sides 20.

The slats 34 carry elongated and outwardly projecting picker teeth 38 which have pointed and slightly curved extremities, said teeth being adapted to penetrate the upper strata of soil and engage the roots and quack grass tearing the same out bodily from the loosened soil and conveying the same upwardly over spaced rods 36.

The forward end of the conveyor frame is adjustable with respect to the longitudinal members 8 of the main frame. The mechanism illustrated in the drawings for effecting this adjustment comprises the following parts:—A rock shaft 39 extends transversely across the longitudinal frame members 8 and disposed above the forward end of the conveyor frame. Said rock shaft may be journaled in suitable brackets 40 secured to frame members 8. At each end of rocker shaft 39 a rocker arm 41 is fixed depending therefrom and having slot and pin connection at its lower and outer end with an upwardly extending strip 42 pivoted to one of the stub shafts 23. A lever 43 is fixed to rock shaft 39 and may have a longitudinally movable tooth 43a engaging a segment 40a at the upper edge of bracket 40. The mechanism described comprises means for elevating the forward end of the conveyor and such a mechanism is provided at each side of the forward end of the conveyor frame.

To yieldingly hold the forward end of the conveyor frame against the ground I provide a pair of arcuate rods 44, one disposed at each side of the forward end of the conveyor frame extending upwardly and slidably connected with bracket 45 which is secured to one of the frame members 8. A relatively strong coiled spring 46 surrounds the lower portion of each of the arcuate rods 44 interposed between bracket 45 and the lower and enlarged extremity of rod 44 which is connected with the forward end of the conveyor frame side 20. A second coiled spring 47 of considerably less tension than spring 46 may surround the upper portion of rod 44 interposed between bracket 45 and a collar 48 fixed to the upper end of rod 44.

The conveyor on which the picker teeth 38 are mounted is driven from the power of the rear wheels. A suitable driving connection is illustrated in the drawings comprising a relatively large sprocket 49 which may be fixed to one of the rear wheels 4, a small sprocket 50 fixed to the outer end of a horizontal stub shaft 52 and a driving chain 51 trained about sprockets 49 and 50. Stub shaft 52 has fixed thereto a gear 53 disposed inwardly of sprocket 50 which gear meshes with a gear 54 fixed to the outer end of the adjacent stub shaft 29. With this driving connection it will be seen that the endless conveyor is driven at relatively high speed and in the opposite direction from the rotation of the wheels 4.

*Operation*

In operation the machine is drawn over the ground by horsepower or tractor and the ground-loosening shovels projected into the upper strata of the soil by releasing lever 16 and swinging the same forward to, for instance, the position shown in the dotted lines. It will be obvious that the teeth of the shovels may be adjusted due to the engagement of the tooth carried by lever 16 with the segment 14a. The shovels, it will be seen, are yieldingly held into the soil by means of the coiled springs 19 and are individually self-adjustable within, of course, certain limits, whereby the soil may be loosened uniformly regardless of small irregularities in the contour of the surface.

The forward end of the tooth-equipped conveyor is properly projected to cause the picker teeth 38 to penetrate the soil to the desired depth. This is accomplished by swinging forward to the desired position, levers 43, one of which is disposed at each side of the machine frame. The slot and pin connections between the lower and outer ends of the rocker arms 41 and the straps 42 connected with the conveyor frame permit the sides of the frame or the forward corners thereof to move up and down within certain limits yieldingly controlled by the coiled springs 46 and 47. The forward end of the conveyor therefore will always be properly positioned with reference to the contour of the ground upon which it is supported. If the ground is undulating and one of the small conveyor-supporting wheels 22 is disposed above the level of the other wheel, the universal joints 26 and 31 permit a weaving action of the sides 20 of the conveyor frame so that the picker teeth carried by slats 34 will be projected a substantially uniform distance into the soil without interfering with the smooth operation of the endless conveyor. This flexibility of the conveyor is further facilitated by the flexible connections at the ends of the several slats 34. My conveyor and conveyor frame are therefore flexibly mounted to permit a weaving action over undulating or irregular ground and I have found this to be of great importance especially inasmuch as the structure permits me to provide machines which will operate upon a wide swath or strip of soil. Without this flexibility the conveyor would have to be relatively narrow and only a small strip of ground could be treated.

My machine, constructed in accordance with the invention herein disclosed may be of considerably wider proportions than the embodiment illustrated and will nevertheless function efficiently, the picker teeth being projected into the ground substantially uniformly throughout the width of the conveyor.

The shovels 13 loosen the upper strata of the soil to a depth slightly below the roots of the quack grass or other weeds without cutting or mangling the roots and quack grass. The picker teeth projected below the loosened soil will engage the loosened roots, bodily removing the same with the weeds and quack grass, conveying the same upwardly over the rods 36. The tooth-carrying conveyor, it will be seen is driven at relatively high speed in order that the picker teeth will engage and remove all the roots and quack grass in the travel of the machine over the ground. Small amounts of soil or dirt removed with the weeds and roots will be shaken off and separated from the roots, falling through rods 36 in the travel of the material upwardly over the conveyor. If desired, a suitable hopper may be mounted at the rear or delivery end of the conveyor or the material may be dumped upon the top of the ground and subsequently collected. It will be noted that the picker teeth preferably are staggered upon the several slats 34 and are curved forwardly at their outer extremities. Such teeth are especially adapted for engaging and removing the tangled or matted roots of quack grass and will bodily lift the roots, and weeds, which have been loosened from the soil by the shovels 13 disposed immediately in advance of the ground-engaging portion of the conveyor.

From the foregoing description it will be seen that I have invented a simple and highly efficient machine for digging and removing quack grass, roots and weeds which infest the soil, capable of operating successfully upon irregular or undulating ground and having a high capacity for work. The flexibility and yieldable mounting of the shovels and operating end of the conveyor frame make the machine self-adjustable for variations in the contour of the ground and prevent fractures of the parts due to obstacles, such as stones or large roots present in the soil. Said flexibility and mounting further make possible the construction of a relatively wide machine for successfully operating upon a wide swath insuring in such a machine the proper projection of the picker teeth into the top strata of the soil.

It will, of course, be understood that various changes may be made in the form, details, proportions and arrangement of the parts, without departing from the scope of applicant's invention, which, generally stated, consists in a device capable of carrying out the objects above set forth, and in the novel parts and combinations of parts disclosed and defined in the appended claims.

What is claimed is:—

1. In a quack grass machine or the like, a wheel-supported frame, a series of depending soil-working elements supported from said frame, an inclined conveyor disposed just rearwardly of said soil-working element, means for supporting the forward end of said conveyor in close relation to the ground, said conveyor having a frame comprising a pair of pivoted sides, pairs of sprockets at the forward and rear ends of said frame over which endless chains are trained, a connecting shaft between each pair of sprockets having universal connections therein, slats extending transversely of said chains and flexibly connected thereto and a series of laterally extending picker teeth carried by said slats and projected for some distance into the top strata of the soil and adapted to engage and remove the roots and weeds loosened by said soil-working elements.

2. In a quack grass machine, a frame adapted for travel over the ground, a series of spaced depending ground-loosening elements independently movable upwardly and downwardly mounted adjacent the forward end of said frame, means for urging said ground loosening elements downwardly, an inclined endless conveyor, the forward end of which is disposed directly behind said ground loosening elements, said conveyor having a series of outwardly extending picker teeth, ground engaging means for holding the forward end of said conveyor with said picker teeth projected for some distance into the top strata of the soil for the purpose of engaging the loosened roots and weeds and removing the same bodily from the soil and conveying the same upwardly.

3. In a quack grass machine, a frame supported for travel over the ground, a series of spaced depending ground loosening elements independently swingable on horizontal axes extending transversely of said frame, means for yieldingly holding said elements downwardly into the soil, an endless inclined conveyor mounted in said frame with its forward end disposed directly behind said ground loosening elements, ground engaging means for holding the forward end of said conveyor spaced a desired distance from the ground and a series of elongated outwardly projecting picker teeth secured to said conveyor and adapted to penetrate the top strata of the soil and engage loosened roots and weeds, removing the same bodily from the soil and conveying the same upwardly.

4. In a quack grass machine, a wheel supported frame, a series of depending ground loosening elements mounted at the forward end of said frame and independently movable upwardly and downwardly, an inclined conveyor frame swingably mounted on said frame with its forward end disposed directly behind said ground loosening elements, an endless conveyor of open work or reticulated type mounted in said frame, said conveyor having a series of elongated outwardly extending picker teeth, arcuate upwardly extending rods fixed to the forward end of said conveyor frame, ground engaging means connected with the forward end of said conveyor frame and springs surrounding said arcuate rods for urging the forward end of said conveyor frame downwardly.

5. In a quack grass machine or the like, a wheel supported frame, an inclined conveyor frame having sides pivotally mounted upon a horizontal axis, pairs of conveyor sprockets at the forward and rear ends of said conveyor frame respectively, a connecting shaft between each pair of said conveyor sprockets having universal connections at its ends with the respective sprockets and an endless conveyor having spaced sides flexibly connected, the side edges of said conveyor being trained over said two sets of sprockets.

6. The structure set forth in claim 5 wherein said conveyor comprises a pair of chains, each trained over one of said rear sprockets and one of said forward sprockets and a series of spaced cross slats pivotally connected at their ends to said respective chains, said pivotal connections being loose to permit a weaving action on said conveyor.

In testimony whereof I affix my signature.

GUST LUNDQUIST.